(12) United States Patent
Hart et al.

(10) Patent No.: US 7,205,052 B2
(45) Date of Patent: *Apr. 17, 2007

(54) MICROBIOLOGICAL ABATEMENT COATING SYSTEM

(75) Inventors: Eric R. Hart, Woodburn, KY (US); Mark D. Brown, Woodburn, KY (US)

(73) Assignee: HBF, Inc., Woodburn, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/534,265

(22) PCT Filed: Nov. 7, 2003

(86) PCT No.: PCT/US03/35665

§ 371 (c)(1),
(2), (4) Date: May 6, 2005

(87) PCT Pub. No.: WO2004/044047

PCT Pub. Date: May 27, 2004

(65) Prior Publication Data

US 2005/0260422 A1    Nov. 24, 2005

Related U.S. Application Data

(63) Continuation-in-part of application No. 10/427,636, filed on Apr. 30, 2003, now Pat. No. 6,844,081.

(60) Provisional application No. 60/425,318, filed on Nov. 8, 2002, now abandoned.

(51) Int. Cl.
*B32B 5/16* (2006.01)

(52) U.S. Cl. ............. 428/532; 428/533; 428/534; 428/535; 428/536; 428/537.1; 427/297; 427/440

(58) Field of Classification Search ........... 428/532, 428/533, 534, 535, 536, 537.1; 427/237, 427/440

See application file for complete search history.

(56) References Cited

U.S. PATENT DOCUMENTS

| | | | |
|---|---|---|---|
| 4,657,988 A | 4/1987 | Sugerman et al. | |
| 5,023,301 A | 6/1991 | Burlett et al. | |
| 5,030,694 A | 7/1991 | Kelley | |
| 5,102,992 A | 4/1992 | Glasser et al. | |
| 5,151,127 A | 9/1992 | Thompson | |
| 5,395,656 A | 3/1995 | Liang | |
| 5,514,731 A | 5/1996 | Nakai | |
| 5,770,319 A | 6/1998 | Franich et al. | |
| 6,051,096 A | 4/2000 | Nagle et al. | |
| 6,124,028 A | 9/2000 | Nagle et al. | |
| 6,387,300 B1 | 5/2002 | Bosserman | |
| 6,638,978 B1 | 10/2003 | Kabara | |
| 6,670,039 B1 | 12/2003 | Nagle et al. | |
| 6,723,352 B2 | 4/2004 | Bosserman | |
| 6,844,081 B2 * | 1/2005 | Hart et al. | 428/532 |

OTHER PUBLICATIONS

Wang, Y., J. Simonsen, C.P. Neto, J. Rocha, and E. Hart, 1995. "The Reaction of Borates with Wood in a Polymer Melt," in *Woodfiber-Plastic Composites: Virgin and Recycled Wood Fiber and Polymers for Composites*, Forest Products Society, Madison, Wisconsin, pp. 107-113.

* cited by examiner

*Primary Examiner*—Leszek Kiliman
(74) *Attorney, Agent, or Firm*—Greer, Burns & Crain, Ltd

(57) ABSTRACT

A wood product is made from treating wood with two solutions, in series, including a penetrating solution and a topcoat composition. The penetrating solution is made up of boric acid, a metallocene catalyst, a free radical initiator, a first film-forming polymer and an adhesion promoter. The topcoat includes a second continuous film-forming polymer. Application of the penetrating solution to the wood gets the solution into the wood to cross-link boric acid with cellulose fibers, then the topcoat forms the continuous film. The topcoat seals in the penetrating solution so that it does not leach out during subsequent exposure to water and weather, allowing soluble salts such as borax to migrate and infiltrate deeper into the wood. Microbiological growth is prevented by several mechanisms.

25 Claims, No Drawings

MICROBIOLOGICAL ABATEMENT COATING SYSTEM

CROSS REFERENCE TO RELATED APPLICATION

This application is a National Phase filing under 35 U.S.C. §371 of PCT Application No. PCT/US03/35665, filed Nov. 7, 2003; which claims priority under 37 C.F.R. §120 of U.S. Provisional Ser. No. 60/425,318, filed Nov. 8, 2002, now abandoned; and is a continuation-in-part of U.S. Ser. No. 10/427,636, filed Apr. 30, 2003, now U.S. Pat. No. 6,844,081, issued Jan. 18, 2005.

BACKGROUND

Products made of wood are naturally beautiful, but they can be subject to damage from a variety of sources under certain conditions. Algae, fungi, bacteria, molds, mildew and their spores and toxins are constantly present in the air around us. When combined with moisture, microbes and insects feast on the cellulose in wood, breaking it down into sugars for energy. The mere presence of microbial growth produces unsightly spots and stains. Wood is weakened by the cellulose breakdown, eventually rotting and becoming unstable. Additionally, the presence of these organisms can trigger allergic reactions in some individuals causing potentially serious health problems. Elimination of cellular growth on surfaces containing wood or other cellulosic materials would reduce undesired reactions in persons with such allergies, as well as to eliminate the unsightly spots that accompany mold growth and preserve the strength and beauty of the wood.

Many systems have been developed to rid surfaces of microorganisms, their spores and toxins. Some of these systems include chemicals that are highly toxic to the microorganisms, but also pose potential health risks to people who work with the materials. Contractors and applicators may be exposed to toxins repeatedly, potentially leading to harm even when exposure is limited.

Other systems remove the unwanted substances from the wood by releasing them into the air. Although damage to the wood may be limited in this manner, an increase in microorganisms, toxins and spores in the air can trigger reactions in those with allergies, and allow the allergens to settle on other surfaces.

Borates have been used to control or manage growth of microorganisms in wood, but the effects have not been long lasting. These water-soluble salts penetrate the surface of wood and other cellulosic materials. However, if exposed to weather or a wet environment, they are just as easily leached from the cellulose. There is no bonding between the borates and cellulose to hold the borate in place or protect it from leaching. If the biocide causes the mold or fungi to go dormant, the spores or semi-dormant organisms may still be present in sufficient quantity to solicit unhealthy reactions.

Another method of protecting wood is by sealing the surface with coatings that are impenetrable by microorganisms. Although this method prevents attack of the surface by insects and microorganisms, it does not consider those already present in the wood before the surface is sealed. A number of microbes survive in an anaerobic environment and can feed on the wood and the water contained therein. If a number of these bacteria are present, the wood can rot from the inside out, loosing strength to the degree that it can crumble when subjected to force.

There is a need in the art for a preservation system for cellulosic products that addresses all of these problems simultaneously. The system should be non-toxic to people and pets yet kill microorganisms on the surface as well as deep within the wood. It should preserve the strength of the wood. Microorganisms, spores and the like should be prevented from spreading, not merely dumped into the environment.

BRIEF DESCRIPTION OF THE INVENTION

These and other needs are met by the present invention. A preservation system is described for cellulose having components with low toxicity and are unlikely allergens.

More specifically, this invention is directed to a treated wood having a surface and substrate including wood cellulose. The treated wood product has the wood cellulose cross-linked with boric acid to form macromolecules of cellulosic borate ester chains to a depth of at least $\frac{1}{16}$ of an inch from the wood surface. A continuous film is cross-linked with the cellulosic borate ester and cured to the wood fiber. The film includes at least one film-forming polymer.

This wood product is made from treating the wood with two solutions, in series, including a penetrating solution and a topcoat composition. The penetrating solution is made up of boric acid, a metallocene catalyst, a free radical initiator, a first film-forming polymer and borax. The topcoat includes a second continuous film-forming polymer. Application of the penetrating solution to the wood gets the solution into the wood to cross-link boric acid with cellulose fibers. A topcoat is then applied that includes at least one film-forming polymer. The topcoat forms a film that bonds with the cross-linked cellulosic borate to seal in the penetrating solution so that it does not leach out during subsequent exposure to water and weather. Sealing in the penetrating solution allows soluble salts such as borax to migrate and infiltrate deeper into the wood.

The wood preservation system of this invention treats wood so that a preservative solution is made part of the wood, then is sealed into the wood by the topcoat so that it cannot leach out. Wood treated by this system is stronger and more resistant to microbial attack than untreated wood. Chemical bonding between the cellulose and the film-forming polymer prevents the sealing layer from cracking or pealing away from the wood.

Sealing of the wood with a polymer film has the added benefit of sealing in all reactants, allowing the bonding reactions, to continue with age. As the wood ages, it gets stronger because any unbonded reactants continue to migrate into the wood, eventually reacting. Macromolecules of cellulose borate ester that are formed penetrate deeper into the wood fibers further protecting the wood.

The treating system of the present invention is very effective in preventing growth of molds, mildew, algae, bacteria and other microbes on wood by several mechanisms. Bonding of the cellulose prevents digestion of the wood, blocking nutrients for the microbes and inhibiting the establishment of colonies in or on the wood. The protective coating also limits access of the microbes to the nutrients. The addition of optional biocides in the penetrating solution and the topcoat seals them into the wood, providing additional defense against microbe growth. This combination of microbial barriers makes it impossible for microbes to thrive on the coating, at the wood surface or within the substrate as long as the protective coating remains in place.

Advantageously, a system with these advantages can also be made safe for home use in areas that are frequented by people. All components that are exposed on the surface can be made with materials of low toxicity, including food grade components. Wood treated with these products can be made safe for use around children and pets.

DETAILED DESCRIPTION OF THE INVENTION

The present invention is directed to a two-component system for protecting wood, or any material based on cellulose. Although the following discussion focuses on wood, the use of these compositions on other cellulosic materials is contemplated. Use of the two-component system is contemplated in areas occupied by people and their pets. Decks attached to the house, walkways, support structures for above-ground swimming pools and the like, are made of wood products that would benefit from the treatment of this invention.

In such applications, it is important to remember that toddlers run barefoot, small children may put their fingers in their mouths after holding a wooden railing and pets will lap up anything tasty on a deck floor. In the following discussion, low toxicity components are preferred as a means of addressing this issue, however it is not intended to be a limitation of the invention. It is contemplated that other embodiments of the invention are suitable in locations where contact with people or animals is minimized. In those embodiments, components are selectable with less regard to contact of the treated wood with surrounding people and environment. Such embodiments may be more effective in protecting wood and abating the growth of microorganisms. Unless otherwise specified, percentages are based on total dry solids of either the penetrating solution on the topcoat solution, as applicable.

The two-part system includes treating the wood with two compositions in series. First, the wood is saturated with a penetrating solution. This solution has components that infiltrate the substrate at the cellular level permitting reaction with microfibrils in the cell walls. There, cellulose reacts with a cross-linking substance to interlock the cellulose. A first film-forming polymer in the penetrating solution becomes integrated into the cross-linked cellulose. Later, a topcoat that includes a second film-forming polymer is applied that then bonds with the interlocking cellulose matrix formed with the penetrating solution and the wood. Thus the penetrating solution gets into the wood and reacts with the cellulose, then when the topcoat is applied, it bonds with the wood/polymer macromolecules sealing the wood from weather, microbes and insects with a coating that will not flake or peel off. This coating system is extremely strong and durable and has good aging properties.

The penetrating solution is the first of the two compositions used in this system. The low-viscosity solution saturates the porous and fiberous wood substrate to deliver the reactive solution to the wood cells and fibers, and eventually, to the microfibrils of the wood cell wall. Water is the preferred solvent due to its low cost and ready availability; however, other polar solvents, such aws N-methyl-2-pyrrlidone, may be useful. Sufficient amount of solvent is used to form a continuous phase polymeric film at the desired thickness. Use of too little water may compromise the film integrity, allowing mold or bacteria to enter the wood at breaks in the film. A desired film thickness is obtainable by application of multiple film layers. Salts present in the water affect the character of the solution, therefore the water used should be as free from contaminants as practical.

The penetrating solution infiltrates the substrate to such an extent that the cellulose goes partially into solution so as to provide a reactive site for the boric acid. With the help of the catalyst, the reaction is more readily completed at ambient temperature and pressure. The reaction is important because the coupling of the boric acid into the cell wall prevents subsequent leaching of the reactant.

Boric acid is a primary component of the penetrating solution. The boric acid acts as a biocide to kill microorganisms and reacts with the cellulose and hemi-cellulose units to from cellulosic borate, an ester of cellulose and boric acid. The ability for unbonded boric acid to flow with the penetrating solution deep into the wood substrate allows it to kill organisms even under the wood surface. Once inside the substrate, the high solubility of the boric acid along with the borax salt in water provides a mechanism to circulate the free biocide throughout the wood, using the moisture present even when the wood appears to be dry. This is particularly advantageous in preventing rotting of sealed wood from the inside by microorganisms trapped in the wood substrate and are unable to escape.

Boric acid also provides several different cross-linking mechanisms to affect cross-linking of the cellulose and hemi-cellulose where the boric acid is the link. Boric acid reacts with the cellulose to form either the cellulose ester or the hemi-cellulose ester. There are also reactions between the hemi-cellulose with the boric acid to form the hemi-cellulose ester. Either the cellulose ester or the hemi-cellulose ester can further react at the boric acid site bonding two or more chains together. A metallocene catalyst, described in detail below, catalyzes each of these reactions.

As these reactions progress, an internal network of highly cross-linked cellulose fiber forms with the boric acid radical acting as a bridge between the fibers. The results are that the wood becomes more plastic. Leaching of the boric acid is significantly reduced because it is chemically bonded to the cellulose. Unbonded boric acid continues to migrate through the moisture contained in the wood until it eventually reacts. As a result, the product ages well, extending the cellulose network for at least several months after treatment.

The combination of properties, that is, the activity as a biocide and the ability to cross-link with cellulose, makes boric acid the ideal substance for this application. Insects and microbes cannot grow and thrive in the wood because the food chain is not allowed to start. The cellulose macropolymer has a structure that is resistant to swelling. It is therefore not subject to attack by microorganisms or even insects because the cellulose is not digested by enzymatic bacteria. Digestive enzymes cannot attach to the microfibril when there is no swelling to provide space between the cellulose chains.

Boric acid is present in the penetrating solution in amounts ranging from about 1% to about 22% and preferably in amounts from about 2.5% to about 15% or from about 7.5% to about 15% based on the dry solids. Technical grade boric acid is suitable, such as that available from U.S. Borax (Valencia, Calif.).

In the absence of a catalyst, reactions between boric acid and cellulose occur only at elevated temperatures. Metallocenes are used to catalyze the reaction between boric acid and the wood cellulose. The metallocene catalysts are organometallic coordination compounds of a transition metal or metal halide. Most metallocenes are crystalline and are soluble in many organic solvents while the halides are primarily soluble in polar solvents. A metal is bonded to cyclopentadienyl rings by electrons in the $\pi$-orbitals moving above and below the plane of the ring. Cyclopentadienyl anions are aromatic rings that are very stable and are able to distribute electrical charges evenly around the ring. This allows them to bond with many different metals of varying valance. These catalysts are well known in the field of polymer chemistry.

Preferred metallocene catalysts for catalyzing the reaction between the boric acid and the cellulose are those containing tin or titanium. Each metal hosts a family of catalysts having a variety of ligands, many of which are available from Kenrich Petrochemicals, Inc. of Bayonne, N.J. Tin-based metallocene catalysts are particularly preferred where rapid reaction is desirable. Titanium metallocene catalysts are slower acting and are preferred where a free radical initiator is added to the penetrating solution during its manufacture. An especially preferred catalyst is titanium IV tris[2-[(2-aminoethyl)amino]ethanolato-O], 2-propanoloato available as KR-44 from Kenrich Petrochemicals, Inc. The catalyst is insoluble in water and must be highly emulsified to be effective in the penetrating solution.

Metallocenes catalyze the reactions between cellulose or hemi-cellulose and boric acid after introduction into the wood with the penetrating solution. As the solution penetrates the wood, the catalyst and boric acid migrate in the solution until they meet and react. Unreacted catalyst and boric acid will continue to disperse in the wood substrate until, eventually, all of the unbonded boric acid has reacted. Preferably, the catalyst is present in the solution in amounts ranging from about 0.05% to about 1% based on the dry solids in the penetration solution. Amounts ranging from about 0.2% to about 0.7% and amounts from about 0.3% to about 0.5% are more preferred.

A free-radical initiator is used to activate the catalyst so that it reacts with the boric acid and cellulose. Preferred free-radical initiators are oxidizers, including silver ions and iodine compounds. Activation of the catalyst begins when the free-radical initiator is mixed with the catalyst. If the initiator acts quickly to form the activated species, it is preferable to add the initiator to the solution very close to the time it is applied to the wood. In this case, it is preferable to add the free-radical initiator just before the product is shipped to the customer or even just before the product is used. For longer shelf-life, free radical initiators that react more slowly, such as iodine compounds, are preferred.

Some oxidizers also enhance the preservative qualities of the boric acid in addition to activating the catalyst. Oxidizers that act over a long time period, such as iodine salts, are particularly preferred. Solutions of silver ions and silver oxide are known to be particularly effective when used in concentrations of 0.5 to 0.75%, based on the weight of the silver compound as a percentage of the total solids present. Other preferred oxidizers include oxygen compounds, such as peroxycarbonates and peroxides, chlorine compounds, tamed iodine (iodine chelated with ethylenediaminetetraacetic acid), amino iodide compounds such as EDDI (ethylenediamine dihydriodides) and time-release chlorinated resins. Iodine amine is a preferred oxidizer in concentrations of from about 1% to about 5%. EDDI is useful at concentrations of about 0.25% to about 2.5% based on the weight of solids in the penetrating solution. Preferably, EDDI is used in amounts from about 0.5% to about 1.25% or more preferably from about 0.8% to about 1.1%

However, iodide compounds have a color and stain the wood. Where the iodide color is objectionable, as when a white coating is being applied, then one of the other suitable free-radical initiators is suitable. Peroxides are also useful to initiate the reaction, even though the peroxides combine with the cellulose to make it reactive, rather than initiating the catalyst. Peroxides are particularly preferred oxidizers, especially organic peroxides such as those used in emulsion polymerization. Organic salts and esters are useful as well. Calcium peroxide is used on concentrations of from about 5% to about 10%.

The penetrating solution also includes a first film-forming polymer. The suitable first film-forming polymer infiltrates the wood substrate with the penetrating solution and bonds with the cellulose borate ester. Preferably, the first film-forming polymer is also compatible with a second film-forming polymer to help bind the topcoat to the wood. Preferably, the polymer is an acrylic or siloxane based polymer or co-polymer. Suitable second polymers form a film over the surface of the wood that is permeable to air and water vapor but is impenetrable to liquids, allowing water vapor to pass through it, maintaining equilibrium between water in the wood and that of the environment. However, movement of liquid water is blocked, reducing leaching of water-soluble substances.

Any acrylic or siloxane polymer is believed to be suitable for use in this composition. Examples of resins that are most preferable include those that form crosslinked acrylic-alkyd-siloxane polymers or urethane-alkyd-siloxane polymers. (Wonder Paint, Inc. Bowling Green, Ky.) Other preferred polymers include polyvinylchloro vinylidene, epoxy-alkyd, polysiloxane, chlorinated rubber, polyolefin, nitrile polymers and urethane polymers. Styrene-butadiene or vinyl chloride resins are useful, as are organic polymers and co-polymers of acrylic or methacrylic esters, styrene, vinyl acetate, monoethylene type unsaturated compounds such as ethylene and propylene, polyurethane, polyester and epoxy resins, urea resins, alkyd resins and derivatives of these resins. Polysiloxanes are also suitable for use as either of the film-forming resins, with organopolysiloxanes being preferred. Up to 95% of the penetrating solution is the first film-forming polymer. Preferably, the polymer concentration is from about 55% to about 80% or from about 65% to about 70%. Additives that are needed for grafting or curing of the polymer should be added according to the manufacturers recommendations.

A highly preferred additive to the penetrating solution is borax. Borax is added in a ratio of from 2:1 to about 1:2 with the boric acid solids. More preferably, borak is added at about a 1:1 ratio with boric acid. Borax acts as a mobile species within the wood, retaining the ability to infiltrate the cellulose even when the boric acid is bound up in the macromolecule formed with the cellulose. Borax also serves to stabilize the polymer, acting as a surfactant. The boric acid is also stabilized by the borax at high concentrations of boric acid, however, if the concentrations are sufficiently high, the salts will precipitate out. Technical grade borax, such as that available from U.S. Borax (Valencia, Calif.) is suitable. Additional preservative salts added with the boric acid are incorporated in the cellulose macromolecule and help reduce microorganisms trapped in the wood during treatment, eradicate spores and to reduce toxins to inert chemical forms.

An optional adhesion promoter is used to enhance the adhesion of the bond between the cellulose macropolymer and the first film-forming polymer. It is this bond that seals the boric acid into the wood so that it can penetrate deeper into the interior of the wood and not be subject to leaching or any extraction. The substrate is originally negatively changed, while the first film-forming polymer is positively charged. During curing, the substrate becomes more cationic, causing a change in polarity. The adhesion promoter maintains the difference in electrostatic charge, holding the coating film on the substrate, sealing the boric acid penetrating solution into the wood and allowing it to penetrate deeper into the wood. The total of all adhesion promoters is preferably present in the penetrating solution in amounts of from about 0.1% to about 3%. More preferably the concentrate of the adhesion promoters totals from about 0.3% to about 2% or from about 0.45% to about 0.9%. Epoxy silanes, such as Z-6040 by Dow Corning, Midland, Mich., and titanium phosphates, such as KR41B and KR46B (Kenrich Petrochemicals, Inc., Bayonne, N.J.) are preferred adhesion promoters. Two or more different adhesion promoters are useful in this composition.

In some embodiments, the adhesion promoter is in either the penetrating solution or the topcoat or is divided between the penetrating solution and the topcoat, such as an embodiment that includes epoxy silane in both components of the treatment. In other embodiments, a plurality of adhesion promoters are used together in the penetrating solution. For example, KR-41B and KR-46B titanium phosphates (Kenrich Petrochemical, Bayonne N.J.) are suitable for use in addition to epoxy silane in the film-forming topcoat.

Surprisingly, when the preferred titanium IV, tris[2-[(2-aminoethyl)amino]ethanolato-O]2-propanolato catalyst is used, it acts as an excellent emulsifier in water and no additional emulsifier is needed to suspend the catalyst. In addition, the catalyst served to emulsify the non-silane adhesion promoters as well. Catalysts having polar ligands, such as amino groups, assist in stabilizing the catalyst in polar solvents such as water. Where the catalyst has less polar ligands, the use of an additional emulsifier is contemplated to suspend the catalyst in water and similar solvents.

An optional wetting agent wets and dissolves the wood, allowing the remaining components of the penetrating solution to get into the wood fibers. Food grade propylene glycol is a highly preferred wetting agent to minimize toxicity to small children and pets. Examples of other suitable wetting agents include dimethyl sulfoxide, n-methyl-2-pyrrolidone (M-Pyrol, GAF Corp., Wayne, N.J.), alcohols, ethylene glycol, esters, mannitol, polyethers and polyglycols. The penetrating solution could include approximately 0.5% to about 20% of the wetting agent based on weight of the solids. Preferably, the wetting agent makes up from about 2% to about 15% or from about 4% to about 12%. When propylene glycol is used in the penetration solution, it also controls water evaporation after the emulsion breaks in the topcoat. A sufficient amount of wetting agent is used that allows penetration of the boric acid of at least 1/16 of an inch into the wood substrate. The depth of penetration is dependant on the pressure under which the penetrating solution is applied.

The penetrating solution is slightly acidic, preferably having a pH range of from about 4.2 to about 6.8. Different types of wood absorb the penetrating solution at different rates. It is preferable to customize the penetrating solution based on the type of wood to which it will be applied. Woods with high oil content, such as cedar or cypress, become saturated faster with less polar solutions, and therefore it is preferred that the pH be at the higher end of the range.

Preparation of the penetrating solution is accomplished in a number of steps. The catalyst is emulsified in water containing the boric acid in a first vessel. The boric acid is added either before or after emulsification. Next the adhesion promoter is added to the emulsified solution and blended. The free radical inhibitor is added, followed by the borax, the biocide and propylene glycol, if present, and mixing well between each addition until the emulsion is clear. Acidity of this emulsion should be adjusted to be similar to the first film-forming polymer so that the emulsion does not destabilize when the polymer is added.

In a second vessel, the first film-forming polymer is combined with a biocide package. In addition to in-can and exterior preservatives, the package may include thickeners, adhesion promoters, curing additives, UV absorbers, defoamers, and other additives. The polymer composition of the second vessel is then blended into the aqueous solution of the first vessel until a homogeneous mixture is obtained. Preferably, the aqueous solution of the first vessel and the polymer composition of the second vessel are used in a ratio of from about 2:1 to about 1:2, with a mixture having a ratio of approximately 1:1 being more preferred. A suitable solution is obtainable by mixing the polymer into the emulsion or vice versa.

The penetrating solution is applied to the wood, preferably in amounts ranging from about 2 mils to about 6 mils in thickness and allowed to dry. This treatment is suitable for use with painted or stained wood or wood that has been pressure treated for outdoor use. It is applied by airless sprayer, roller, brush or paint pad. In commercial settings, the coating is adaptable to a variety of different coating apparatus, including a spray coater, curtain coater, roll coater, rod coater and the like. Those skilled in formulating coating compositions are able to modify coatings to take advantage of available equipment. Application of the penetrating solution under pressure is also contemplated. This invention is ideal for wood saturation at high pressure so as to impregnate the wood to an even greater degree than is obtainable when the penetrating solution is applied at atmospheric pressure.

After the wood is treated with the penetrating solution, a topcoat that includes a second insoluble, film-forming polymer resin is applied. Any of the resins disclosed above relative to the first film-forming resin are suitable for use as the second film-forming resin. In some embodiments, the first film-forming polymer and the second film-forming polymer are different, allowing customization of the treatment by selection of polymers with specific properties. For example, an acrylic polymer could be used in the penetrating solution, while an acrylic epoxy is present in the topcoat.

However, in other embodiments, it is useful to use the same film-forming polymers in both components of the treatment. In these embodiments, the topcoat is prepared, then a portion of the topcoat is blended with an aqueous solution of boric acid, the free-radical initiator, catalyst and other ingredients to prepare the penetrating solution. If the same film-forming polymer is used in both the penetrating solution and the topcoat, compatibility of the polymeric component of the solutions is assured and the topcoat will bond to the penetrating solution.

Many of the optional ingredients are suitable for inclusion in either the penetrating solution, the topcoat, or both. Wetting agents described above, particularly propylene glycol, are useful in the topcoat in amounts of from about 0.5% to about 5%. The adhesion promoters, particularly epoxy silane and the titanium phosphates, are suitable in the topcoat in amounts of from about 1% to about 4%, preferably from about 2% to about 3%.

Optionally, an optical brightener, is added to the topcoat or penetrating solution prior to application. Optical brighteners absorb ultraviolet light and emit it in as blue/violet visible light spectrum. When exposed to a black light, the brightener reflects in such a way that the thickness of the film can be determined. Examples of optical brighteners are coumarone indene compounds, such as those sold by Rampak Group Inc. (Houston, Tex.) under the names KCB, OB, CBS, OB-1.5, OB-16, ER, SWN, KSN, OB-2, OB-1, FP or CBS-127. The topcoat preferably includes from about 0.1% to about 0.25% of the optical brightener, which is included as a quality control device. A receiving light sensor could be calibrated to determine the thickness of the film. In the penetrating solution, the concentration of optical brightener is from about 0.03% to about 0.5% based on dry solids. If a plurality of layers is used in the film, different colors of optical brighteners could be useful to identity the thickness of each layer.

Additional optional ingredients can be added to the topcoat film to enhance its performance under particular conditions. Water repellents, such as silicones, can be added to the topcoat in amounts of from about 1% to about 5% to aid in shedding water. For areas where there are large amounts of sunlight, ultraviolet absorbers, such as TINUVAN 328, TINUVAN 1130 or TINUVAN 292 (Available from Ciba Specialty Chemical Corporation, Tarrytown, N.Y.) can be added to the topcoat in amounts of from about 1.5% to about 3.5%. Pigments are optionally added as ultraviolet absorbers and for color. Such pigments may also stabilize the system. Zinc borate, iron oxide, titanium oxide, aluminum trihydrate, colloidal antimony and chlorinated compounds are examples of a preferred pigment materials.

Optional solvent and oil repellents, such as D-limonene, provide the topcoat with good film integrity when used in amounts of from about 0.5% to about 3%. D-limonene enhances the activity of the adhesion promoters for longer periods of time. Once the penetrating coat has been applied, the topcoat is preferably applied within a few hours so that it bonds with the adhesion promoters. However, if the adhesion promoters have become inactive before application of the topcoat, the addition of D-limonene to the topcoat reactivates the promoters and allows formation of bonds between the polymeric film topcoat and the adhesion promoters of the penetrating solution.

A biocide is optionally added to either the penetrating solution or the topcoat to further inhibit growth of any molds, fungi, mildew, bacteria or other microorganism to the coating surface. Preferably the biocide acts as an in-can preservative to prevent growth of microorganisms during the shelf-life of the product. Biocides that are not toxic to people or pets are preferred, such as BUSAN 1024 or BUSAN 1292 available from Buckman Laboratories, Inc. (Memphis, Tenn.) or TROYSAN 588 (Troy Technology Corporation, Wilmington, Del.). Biocides are used in amounts from about 0.5% to about 2.5% based on total solids in the topcoat or according to the manufacturer's guidelines. The use of algaecides, bactericides, fungicides or any other biocides are suitable. Inclusion of a biocide within the film helps to inhibit decay of the coating by fungi penetrating the surface of this film and causing it to breakdown. Preferably, the biocide is encapsulated in the topcoat film by emulsifying these components together.

The topcoat composition is prepared by emulsifying any of the optional components with the second film-forming polymer. Although it is contemplated that the first and second film-forming polymers be different, in some embodiments of the invention they are the same polymer. If this is the case, preparation of the penetrating solution is simplified. After emulsifying the polymer with any optional components, a portion of the polymer composition is added to the aqueous solution and blended. Thus, in this special case, only a single polymer component need be prepared, and it is used in both the penetrating solution and the film-forming solution.

During application, the topcoat should be applied only as thick as necessary to seal in the penetrating solution. Preferably the topcoat is from about 4 to about 10 mils thick or more preferably from about 6 to about 8 mils in thickness. The topcoat is applied after the penetrating solution by any of the methods disclosed above. The time interval between application of the penetrating solution and the topcoat is preferably less than 2–3 hours so that all of the components are in place as the chemical reactions progress. However, if the penetrating solution is applied and the topcoat application is delayed, the addition of D-limonene to the topcoat reactivates the adhesion promoters and permits bonding of the topcoat to the penetrating solution.

After the treatment has been applied, some of the cellulose near the surface of the wood will have reacted with the boric acid and the first film-forming catalyst to form cross-link-ed macromolecules including cellulosic ester chains. Preferably, the macromolecules penetrate at least from about $1/16$ of an inch to about $1/8$ of an inch into the wood substrate. Unbonded boric acid, the free-radical initiator, the metallocene catalyst and optional components of the penetrating solution migrate within the wood substrate. As the wood ages, the boric acid will eventually be bonded to the macromolecules.

On the wood surface, the second film-forming polymer has formed a continuous film topcoat over the surface of the wood and is bonded to the cross-linked macromolecules within the wood substrate. The adhesion promoters will have become concentrated at the interface between the topcoat and the wood surface to improve adhesion of the topcoat to the wood. Optional components of the topcoat will be dispersed through the film.

EXAMPLE

A penetrating colution was prepared using the following components:

TABLE I

| COMPONENT | CONCENTRATION |
|---|---|
| Tertiary acrylic Polymer | 64.3% |
| KR-44 Metallocene Catalyst | 0.3% |
| KR-41B Adhesion Promoter | 0.15% |
| KR-46B Adhesion Promoter | 0.15% |
| Z-6040 Epoxy | 0.15% |
| Boric Acid | 10.4% |
| Propylene Glycol | 5.4% |
| Additive Package | 7.4% |
| Optical Brightener | 0.3% |
| Borax | 10.4% |
| EDDI | 1.04% |

The Additive Package included:

TABLE II

| COMPONENT | CONCENTRATION |
|---|---|
| Thickener | 8.4% |
| UV Absorbers | 3.1% |
| PEG 200 Coalescent | 3.0% |
| In-Can Preservative | 6.9% |
| Exterior Coating Preservative | 26.5% |
| Algaecide | 4.4% |
| Curing Additives | 1.1% |
| Defoamer | 45.9% |
| Z-6040 Adhesion Promoter | .6% |

The KR-44 catalyst was emulsified in water in which the boric acid was dissolved. Adhesion promoters, borax, EDDI, propylene glycol and optical brighteners were added sequentially, mixing the solution thoroughly after adding each component. The solution was mixed until it was clear.

In another vessel, the prereacted tertiary polymer was combined with the additive package. The emulsion was then added to the polymer and blended until a uniform liquid was obtained.

While particular embodiments of the present invention have been shown and described, it will be appreciated by those skilled in the art that changes and modifications may be made thereto without departing from the invention in its broader aspects and as set forth in the following claims.

What is claimed is:

1. A treated wood having a surface and substrate of wood cellulose comprising:
    wood cellulose cross-linked with boric acid and a first film-forming polymer to form macromolecules including cellulosic borate ester chains;
    a continuous film topcoat, comprising a second film-forming polymer, cross-linked with said macromolecules;
    borax dispersed in said substrate; and
    a metallocene catalyst dispersed in said substrate.

2. The treated wood of claim 1 further comprising a free-radical initiator.

3. The treated wood of claim 1 wherein said free-radical initiator comprises at least one selected from the group of iodine compounds, oxidizers, silver solutions and peroxides.

4. The treated wood of claim 1 wherein a biocide is encapsulated in said topcoat.

5. The treated wood of claim 1 wherein said first film-forming polymer and said second film-forming polymer are the same polymer.

6. The treated wood of claim 1 wherein said metallocene catalyst comprises at least one of the group consisting of tin and titanium.

7. The treated wood of claim 1 wherein said second film-forming polymer comprises at least one of an acrylic siloxane polymer and a urethane siloxane polymer.

8. The treated wood of claim 1 wherein said cellulose borate macromolecules penetrate the substrate to a depth of about 1/16 of an inch to about 1/8 of an inch.

9. A coating system for treating wood comprising:
    a penetrating solution comprising boric acid, a metallocene catalyst, borax, a free radical initiator and a first film-forming polymer;
    a topcoat composition comprising a second film-forming 5 polymer; and
    at least one of said penetrating solution and said topcoat composition further comprises an adhesion promoter.

10. The coating system of claim 9 wherein said first film-forming polymer is present in the penetrating solution in amounts of from about 55% to about 80% based on dry solids.

11. The coating system of claim 9 further comprising a wetting agent.

12. The coating system of claim 11 wherein said wetting agent comprises propylene glycol.

13. The coating system of claim 12 wherein said free radical initiator is present in the penetrating solution in amounts from about 0.25% to about 2.5% based on dry solids.

14. The coating system of claim 9 wherein said free radical initiator comprises at least one selected from the group of iodine compounds, oxidizers, silver solutions and peroxides.

15. The coating system of claim 9 wherein said boric acid is present in amounts from about 1% to about 20% based on the weight of the dry solids in the penetrating solution.

16. The coating system of claim 9 wherein said metallocene catalyst comprises tin or titanium.

17. The coating system of claim 9 wherein said metallocene catalyst is present in amounts from about 0.1% to about 1.0% based on the weight of the dry solids of the penetrating solution.

18. The coating system of claim 9 wherein said first film-forming polymer is the same polymer as said second film-forming polymer.

19. The coating system of claim 18 wherein said film-forming polymer comprises an acrylic polymer.

20. The coating system of claim 9 wherein said adhesion promoter comprises epoxy silane.

21. A method of treating wood comprising:
    emulsifying an aqueous solution of boric acid with a metallocene catalyst;
    mixing borax into the emulsified solution;
    adding a free-radical initiator to said aqueous solution;
    emulsifying a first film-forming polymer with said aqueous solution to make a penetrating solution;
    providing a topcoat coat composition comprised of a second film forming polymer;
    applying the penetrating solution to wood substrate; and
    applying the topcoat composition to the wood substrate previously treated with the penetrating solution.

22. The method of claim 21 further comprising emulsifying said second film-forming polymer with a biocide prior to said applying step.

23. The method of claim 21 further comprising blending at an adhesion promoter and propylene glycol to said emulsified solution prior to the stop of adding the free radical initiator.

24. A treated wood product comprising:
    wood treated with a penetrating solution comprising boric acid, a metallocene catalyst, a free-radical initiator, and a first film forming polymer, and coated with a topcoat composition comprising a second film-forming polymer, said second film-forming polymer bonded to said first film-forming polymer.

25. A treated wood product as in claim 24 further comprising borax dispersed in the wood.

* * * * *